Dec. 11, 1962    E. L. FELCH    3,068,070
CONDENSATION OF PHOSPHORUS VAPOR WITH LIQUID PHOSPHORUS
Filed Sept. 20, 1960    3 Sheets-Sheet 1

INVENTOR.
ELROY L. FELCH
BY Robert S. Dunham
ATTORNEY

Dec. 11, 1962           E. L. FELCH           3,068,070
CONDENSATION OF PHOSPHORUS VAPOR WITH LIQUID PHOSPHORUS
Filed Sept. 20, 1960           3 Sheets—Sheet 3
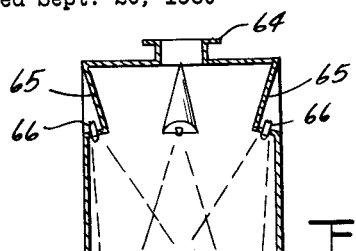
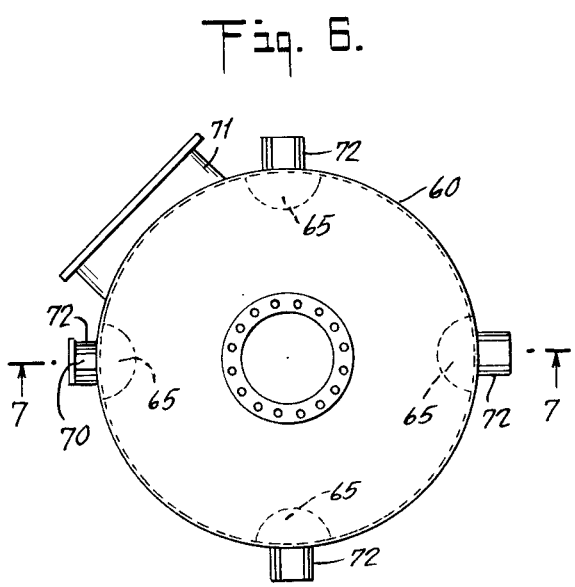
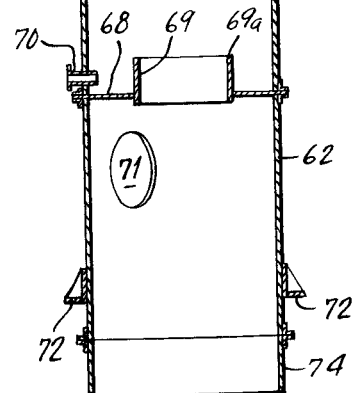
INVENTOR.
ELROY L. FELCH
BY
Robert S. Dunham
ATTORNEY

United States Patent Office 3,068,070
Patented Dec. 11, 1962

3,068,070
CONDENSATION OF PHOSPHORUS VAPOR WITH LIQUID PHOSPHORUS
Elroy L. Felch, Westfield, N.J., assignor to The American Agricultural Chemical Company, New York, N.Y., a corporation of Delaware
Filed Sept. 20, 1960, Ser. No. 57,204
8 Claims. (Cl. 23—223)

This invention relates to elemental phosphorus. More particularly, this invention relates to a method and apparatus for the condensation and recovery of gaseous phosphorus from gaseous streams containing the same. In accordance with a specific embodiment this invention is directed to the condensation and recovery of gaseous, elemental phosphorus from the gaseous effluent of an electric furnace employed in the manufacture of elemental phosphorus by the reaction of a calcium phosphate with silicon dioxide and carbon, the gaseous effluent from the furnace containing substantial amounts of carbon monoxide and phosphorus.

In the manufacture, condensation and recovery of elemental phosphorus from the gaseous effluent of an electric furnace wherein elemental phosphorus is produced by chemical reaction involving calcium phosphate, silicon dioxide and carbon, it has been the practice heretofore to gradually cool the gaseous effluent to a temperature below the dew point of the phosphorus therein. When the gaseous effluent is cooled below the dew point of the phosphorus therein, the gaseous phosphorus condenses usually with the formation of a phosphorus fog containing minute, almost microscopic, droplets of liquid phosphorus. Heretofore the resulting condensed phosphorus has been recovered by passing the cooled gaseous effluent containing these phosphorus droplets along an elongated path into contact with relatively cold, volatile liquids such as water or aqueous solutions.

The recovery of the condensed phosphorus by this method has not been completely satisfactory since the phosphorus fog is very persistent and difficult to dispel and it is difficult to recover the phosphorus therein. Further, the elongated path necessary to cool the gaseous effluent and to effect the removal and dispelling of the phosphorus fog is quite sizable and involves a substantial investment in equipment. It has been observed in actual commercial operations that once a phosphorus fog has been formed it is extremely difficult to dispel and to recover the phosphorus therein despite substantially any amount of water spraying or falling curtains or films of water or aqueous solutions employed to contact and wash the gaseous effluent containing the phosphorus fog. Further, the dispelling of phosphorus fog from the gaseous effluent is made more difficult and is aggravated by the use of aqueous liquids as a cooling-condensing and fog dispelling medium since aqueous liquids are relatively quickly vaporized into the gaseous effluent and tend to lower the concentration or partial pressure of the gaseous phosphorus therein, thereby making it even more difficult to recover all of the phosphorus and at the same time necessitating the handling of a larger volume of gaseous effluent.

Accordingly, it is an object of this invention to provide an improved method and apparatus for the condensation of gaseous phosphorus.

It is another object of this invention to provide an improved apparatus for effecting the condensation and recovery of gaseous phosphorus from the gaseous effluent emanating from an electric furnace employed in the manufacture of elemental phosphorus.

Yet another object of this invention is to provide an improved method for the manufacture of elemental phosphorus.

Still another object of this invention is to provide a method for condensing gaseous phosphorus into liquid phosphorus without at the same time giving rise to the formation of a phosphorus fog containing minute droplets, almost microscopic in size, of liquid phosphorus.

Still another object of this invention is to provide a method for the manufacture and recovery of elemental phosphorus wherein equipment requirements, particularly the equipment requirements for the condensation of gaseous phosphorus, are substantially reduced.

How these and other objects of this invention are accomplished will become apparent in the light of the accompanying disclosure and the drawings wherein:

FIGS. 1, 2 and 3 graphically illustrate the influence of temperature and gas composition (phosphorus partial pressure) upon the condensation of gaseous phosphorus to liquid phosphorus, particularly defining those conditions which give rise to or avoid phosphorus fog formation during the cooling and condensing operation;

FIG. 4 graphically represents the vapor pressure curve of phosphorus and certain aspects of the practice of this invention;

FIG. 5 schematically illustrates in a flow diagram the practice of this invention as particularly applied to the condensation and recovery of phosphorus from the gaseous effluent of an electric furnace;

FIG. 6 is a plan veiw of a phosphorus condenser in accordance with this invention;

FIG. 7 is a cross sectional view taken along line 7—7 of FIG. 6.

Figure 1:
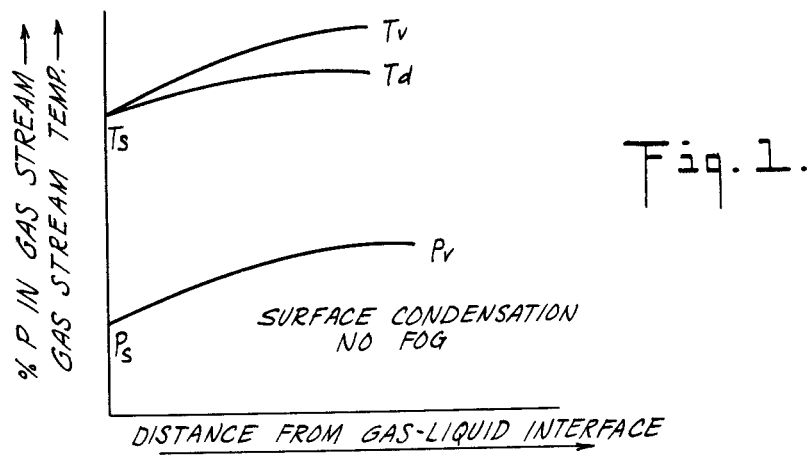

In accordance with this invention gaseous phosphorus is condensed by contact with relatively cold liquid phosphorus. More particularly in accordance with the practice of this invention an improved method and apparatus for the condensation and recovery of gaseous phosphorus is provided by contacting gaseous phosphorus under conditions to condense the gaseous phosphorus directly into liquid phosphorus condensing medium, the aforesaid phosphorus condensing operation being carried out in a condensation zone, preferably a substantially vertically-extending condensation zone, provided with a plurality of means for effecting direct contact, preferably direct countercurrent contact, between a flowing stream containing gaseous phosphorus and a stream, continuous or discontinuous, or spray of liquid phosphorus.

The practice of this invention is particularly applicable to the recovery of gaseous phosphorus from gaseous effluent emanating from an electric furnace employed for the manufacture of elemental phosphorus wherein a calcium phosphate is reacted with silicon dioxide and carbon at a high temperature to yield a gaseous effluent comprising substantial amounts of gaseous phosphorus and normally gaseous carbon monoxide. In this embodiment of the invention the gaseous effluent from the electric furnace is contacted with a body of water to effect at least partial cooling of the effluent and separation and removal therefrom of entrained or volatilized normally solid materials, such as dust particles and the like.

The resulting partially cooled gaseous effluent, now substantially free of dust particles, is then further cooled by direct contact with relatively cold liquid phosphorus. The aforesaid liquid phosphorus contacting operation is preferably carried out in a multi-stage countercurrent operation, the partially cooled gaseous effluent containing gaseous phosphorus and carbon monoxide passing in direct contact with a spray of liquid phosphorus in a multi-stage phosphorus condensation zone. The condensation of gaseous phosphorus by direct contact with liquid phosphorus within the condensation zone is carried out under conditions such that the formation of any substantial amount of phosphorus fog, i.e. a dispersion of finely divided, almost microscopic droplets of liquid phosphorus in the resulting cooled gaseous effluent containing carbon monoxide, is avoided.

The gaseous effluent undergoing cooling within the condensation zone for the condensation of phosphorus therefrom is contacted with a downwardly falling spray of relatively cold liquid phosphorus in a multi-stage operation, such as a two-stage operation. In the first stage of the contacting operation which is conveniently carried out in a vertically-extending, elongated contacting-condensation zone together with the other subsequent stages or contacting-condensation operations, the gaseous stream comprising phosphorus and carbon monoxide, after removal of dust particles and other normally solid materials therefrom, is passed into direct countercurrent contact with a spray of liquid phosphorus which is supplied at a relatively low temperature. During this first stage contacting operation the gaseous phosphorus-containing stream is usually supplied thereto at an elevated temperature, such as a temperature in the range 150–450° C., more or less, and the liquid phosphorus is supplied at relatively low temperatures, such as a temperature in the range 55–90° C.

There issues from the first stage contacting operation resulting cooled gaseous effluent at a temperature in the range about 60–100° C. and having a reduced phosphorus content. In the directly subsequent second stage contacting operation the cooled gaseous effluent is contacted with additional cooled liquid phosphorus, such as liquid phosphorus at a temperature in the range 45–65° C. to condense additional phosphorus from the gaseous stream.

As a result of these contacting operations there is recovered overhead from the contacting-condensation zone a gaseous stream comprising substantially only carbon monoxide and containing a very minor amount of phosphorus. This overhead gaseous stream is then contacted with a spray of cold water, such as water at a temperature in the range 5–15° C., more or less, to condense and recover additional phosphorus values therefrom. The aforesaid multi-stage contacting operations wherein liquid phosphorus is employed to condense phosphorus from the gaseous stream are carried out under temperature conditions (the temperature of the liquid phosphorus) such that the formation of any substantial amount of phosphorus fog is avoided, specifically under conditions such that the formation of a gaseous stream supersaturated with phosphorus is avoided.

As indicated hereinabove an important feature of the practice of this invention is the avoidance of formation of a phosphorus fog during the cooling operation wherein gaseous phosphorus is condensed to liquid phosphorus. The formation of a phosphorus fog during the cooling-condensation operation is prevented by carrying out the cooling-condensation operation such that the gaseous phosphorus-containing stream does not become supersaturated with phosphorus. Supersaturation of the gas stream with phosphorus will occur during the cooling-condensation operation whenever heat is removed from the gas stream at a rate compared to the rate of a mass transfer of phosphorus (phosphorus condensation into the relatively cold liquid phosphorus) sufficient to cause the temperature of the gas stream to fall below the dew point of the phosphorus therein.

Figure 2:
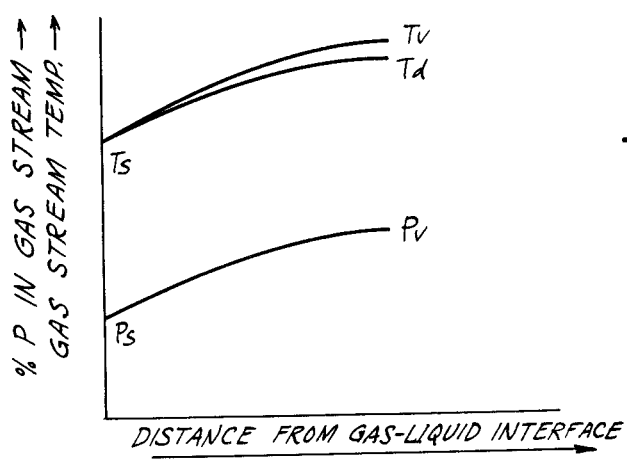
Figure 3:
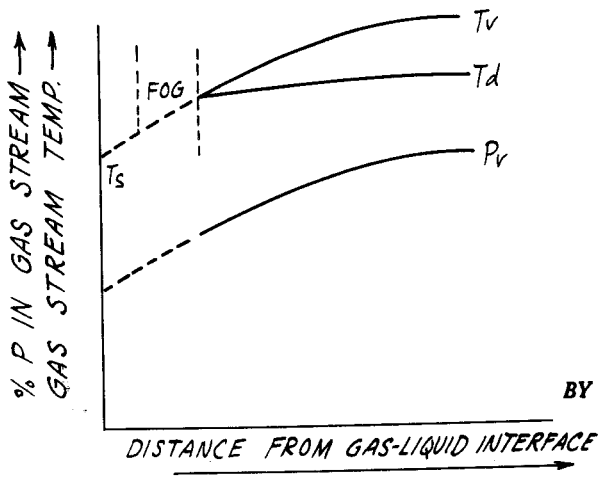

Reference is now made to the drawings and particularly to FIGS. 1–3 thereof which graphically illustrate those conditions which avoid or give rise to phosphorus fog formation during the cooling of a gas stream containing gaseous phosphorus when liquid phosphorus is employed as the cooling-condensation medium during the cooling-condensation operation. There will be finite phosphorus partial pressure and gas temperature gradients extending from the surface of liquid phosphorus employed as the cooling-condensation medium across the gas film containing gaseous phosphorus and in contact with or surrounding the liquid phosphorus cooling medium. The conditions at any point during the cooling-condensation operation employing liquid phosphorus as the cooling-condensing medium may be represented by profiles of gas temperature and phosphorus partial pressure across the gas film. Corresponding to these profiles there is also a phosphorus dew point profile across the gas film.

FIG. 1 shows the various relationships which may exist during the cooling-condensing of a phosphorus-containing gas stream employing liquid phosphorus as the cooling-condensing medium. The curve $T_v$—$T_s$ is the actual temperature profile across the gas phase or film surrounding or in contact with the liquid phosphorus condensing medium. The curve $P_v$—$P_s$ is the corresponding phosphorus partial pressure profile of the gas film and the curve $T_d$—$T_s$ is the corresponding phosphorus dew point profile of the gas film. In the condition illustrated in FIG. 1 phosphorus condensation takes place only directly on the surface of the relatively cool liquid phosphorus condensing medium (temperature $T_s$) and the dew point curve and the temperature curve must meet at $T_s$.

FIG. 3 represents the situation wherein phosphorus saturation or supersaturation exists in the phosphorus-containing gas stream during the cooling-condensation operation employing liquid phosphorus (temperature $T_s$) as the cooling-condensing medium. As illustrated, the dew point curve and the temperature curve meet at a point in the gas stream or gas film surrounding a body of the liquid phosphorus employed as the cooling-condensing medium. When this condition arises condensation takes place in the gas phase and phosphorus fog formation occurs.

FIG. 2 graphically illustrates an intermediate or critical condition between the conditions illustrated in FIG. 1 wherein no phosphorus fog formation can theoretically take place and FIG. 3 wherein a condition of saturation or supersaturation exists in the gas phase and fog formation can take place provided nucleation conditions are existent, i.e., the presence of minute, microscopic, solid particles which act as condensation sites for the phosphorus. As a transition from the conditions illustrated in FIG. 1 to the conditions illustrated in FIG. 3 takes place owing to a decrease of $T_s$ or $T_v$, or to an increase in $P_v$, the condition graphically illustrated in FIG. 2 will be intermediate in time sequence. If condensation is taking place at the surface of liquid phosphorus cooling-condensing medium and $T_s$ (surface temperature of the liquid phosphorus) is lowered, the two temperature curves will meet at an angle which decreases until the curves are tangent at the surface of the condensing medium, $T_s$. Then, if $T_s$, the temperature of the condensing surface (liquid phosphorus upon which condensation is taking place), is lowered still more the curves will meet somewhere in the gas film or in the main body of the phosphorus-containing gas undergoing cooling thereby giving rise to the condition illustrated in FIG. 3.

Figure 4:
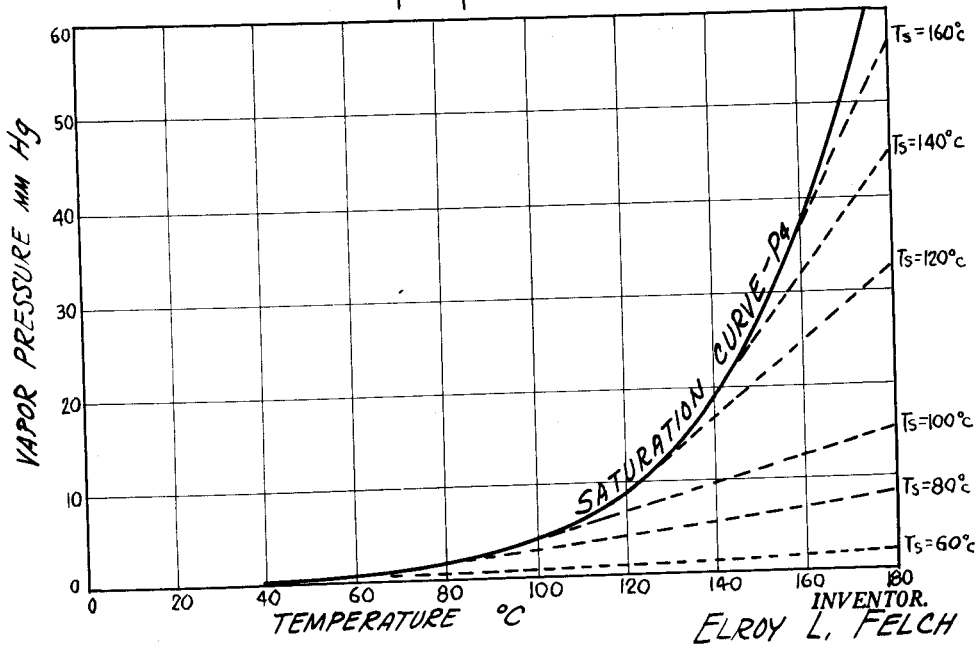

Referring now to FIG. 4 of the drawings, there is illustrated therein limits for fog formation during the condensation of gaseous phosphorus from a gaseous stream employing relatively cold liquid phosphorus as the cooling-condensing medium. The family of curves relative to the temperature $T_s$, the surface temperature of the liquid phosphorus cooling-condensing medium, serves to define the conditions wherein phosphorus fog formation will occur or will not take place during the cooling-condensing operation. For any condition of the phosphorus-containing gaseous stream represented by a point lying above the curve for a given surface temperature $T_s$ of the liquid phosphorus cooling medium fog formation during the cooling-condensing operation is possible. If the point for the given condition lies below the respective $T_s$ curve of the liquid phosphorus condensing medium fog formation is impossible.

Figure 5:
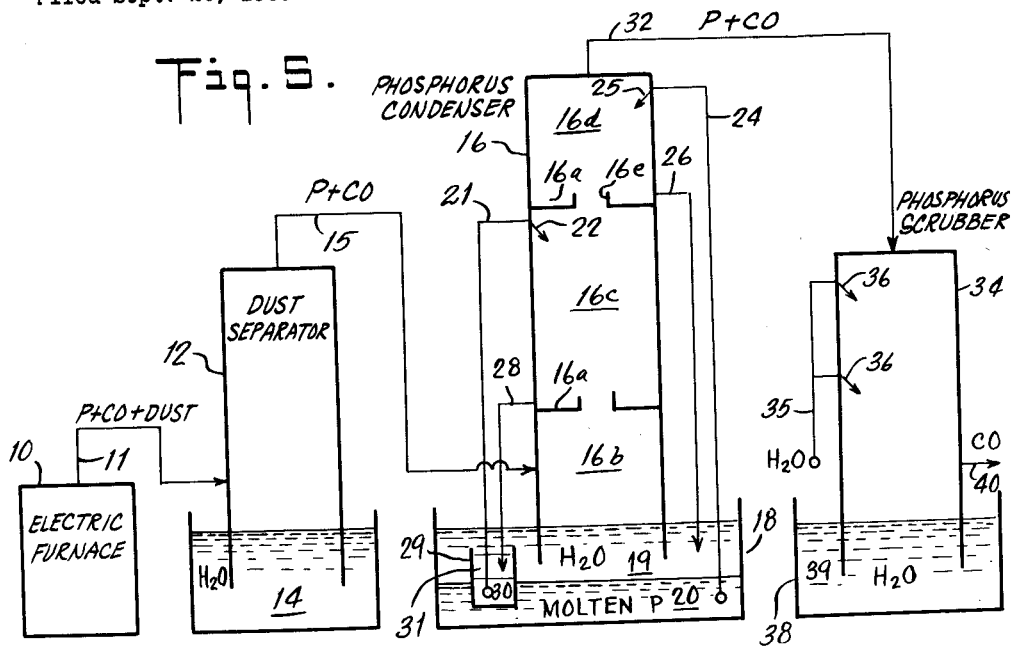

Referring now to FIG. 5 of the drawings, which schematically illustrates a practice of this invention as applied to the condensation and recovery of phosphorus from the gaseous effluent of an electric furnace employed in the manufacture of elemental phosphorus, an admixture comprising a calcium phosphate, silicon dioxide (sand) and carbon (coke) is electrically heated in electric furnace 10 under high temperature conditions to yield a gaseous stream comprising elemental phosphorus ($P_4$) and carbon monoxide, usually in the proportion of about 13 mols CO per mol $P_4$, together with entrained dust particles and other volatilized normally solid materials. The hot, gaseous effluent from electric furnace 10 at a temperature above about 450° C., more or less, is removed therefrom via conduit 11 and passed into the lower portion of dust separator 12.

Within dust separator 12 the hot gaseous effluent contacts body 14 of relatively cool aqueous liquid, water, whereby some cooling of the gaseous effluent takes place and separation of solid dust particles and other normally solid materials from the gaseous effluent into the body of water 14 occurs. There is recovered from the upper portion of dust separator 12 via conduit 15 a gaseous stream now having a reduced dust content as well as a reduced amount of normally solid materials therein. The gaseous stream in conduit 15 is at substantially atmospheric pressure and contains a substantial amount of phosphorus, usually an amount of phosphorus sufficient to yield a phosphorus ($P_4$) partial pressure in the range 15–80 mm. Hg, such as 30–50 mm. Hg. The temperature of the gaseous stream in conduit 15 is usually in the range 150–450° C., more or less.

The gaseous phosphorus-containing stream in conduit 15, such as at a rate of about 2500 s.c.f. per minute, is then introduced into the lower portion of phosphorus condenser 16. Phosphorus condenser 16 is shown partitioned into three sections by annular baffles 16a, a lowermost, entry section 16b, a first cooling-condensing contacting section 16c and a second cooling-condensing contacting section 16d. The open bottom of phosphorus condenser 16 is positioned and supported within water tank 18 within which is maintained a supernatant body of aqueous liquid or water 19 above a more dense body of liquid phosphorus 20. The temperature of the body of water 19 within tank 18 is maintained above the melting point of phosphorus, i.e. above about 45° C. to prevent the body 20 of phosphorus from solidifying.

As the gaseous phosphorus-containing stream is introduced via conduit 15 into entry section 16b of phosphorus condenser 16 some initial cooling of the gaseous stream takes place. The gaseous stream then passes from entry section 16b to first cooling-condensing contacting section 16c wherein it is brought into contact with a spray of liquid phosphorus introduced into the upper portion of section 16c by means of conduit 21 and liquid phosphorus spray head 22. The liquid phosphorus supplied to section 16c via conduit 21 and spray head 22 is usually at a temperature in the range 55–90° C., such as a temperature in the range 60–70° C. As a result of the countercurrent contact with the relatively cold liquid phosphorus within section 16c there issues from section 16c via opening 16e of uppermost baffle 16a into second cooling-condensing contacting section 16d a cooled gaseous phosphorus-containing gaseous stream at a temperature in the range 60–100° C., such as a temperature of about 80° C. and containing an amount of gaseous phosphorus equivalent to a phosphorus ($P_4$) partial pressure in the range 1–10 mm. Hg, such as 3–5 mm. Hg.

This resulting cooled phosphorus-containing gaseous stream thus-introduced into section 16d is contacted with a spray of relatively cold liquid phosphorus supplied to the upper portion of section 16d via conduit 24 and liquid phosphorus spray head 25, the liquid phosphorus supplied to the upper portion of section 16d being at a temperature usually in the range 45–65° C. Desirably the temperature of the liquid phosphorus approaches 45° C., the melting point of phosphorus, without running the risk of solidifying the liquid phosphorus within section 16d or in spray head 25 and supply conduit 24.

As indicated, the liquid phosphorus supplied to the upper portion of section 16d via line 24 and spray head 25 is derived from the body 20 of liquid phosphorus at the bottom of tank 18. The liquid phosphorus supplied to section 16d via spray head 25 and the phosphorus condensed therein is recovered from the lower portion of section 16d via line 26 and introduced into tank 18 beneath the surface of the body 19 of water therein. Since liquid phosphorus is more dense than water it rapidly settles to the bottom of tank 18 and joins the body 20 of liquid phosphorus already therein. Similarly, the phosphorus condensed within section 16c together with the liquid phosphorus introduced thereinto via conduit 21 and spray head 22 is recovered from the lower portion of section 16c via conduit 28 for discharge into separator tank 29 provided within tank 18. Separator tank 29 contains a body of molten phosphorus 30 beneath a supernatant body 31 of water. The body of phosphorus 31 within separator tank 29 is at a relatively higher temperature than the body 20 of liquid phosphorus in tank 18, the temperature of the body 30 of phosphorus being in the range 55–90° C., whereas the temperature of the body 20 of phosphorus in water tank 18 is in the range 45–65° C. It is mentioned that about 3 volumes of liquid phosphorus is supplied to condenser 16 via conduit 24 per volume supplied via conduit 21, the liquid phosphorus being supplied to condenser 16 at a total rate of about 160 gallons per minute. The temperature of liquid phosphorus discharged into separator tank 29 via conduit 28 is about 100° C. whereas the temperature of liquid phosphorus discharged into tank 18 via conduit 26 is about 60° C. From time to time, by means not shown, liquid phosphorus is drawn off as product from separator tank 29 and from water tank 18. As a result of the aforesaid contacting-cooling operation about 98–99% of the phosphorus supplied to condenser 16 via line 15 is condensed and recovered compared to a recovery of about 93–94% in conventional condensers and condensing operations which also involve much more condensing equipment.

Following the liquid phosphorus contacting operation there issues from the upper portion of section 16d via conduit 32 a lean, gaseous, phosphorus and carbon monoxide-containing stream at a temperature in the range 45–60° C., such as 50° C., having a phosphorus partial pressure in the range 0.1–0.5 mm. Hg, usually in the range 0.25–0.5 mm. Hg. This lean phosphorus-containing stream is then introduced via line 32 to the upper portion of phosphorus scrubber 34 wherein it is contacted with a spray of relatively cold water supplied to scrubber 34 via line 35 and spray head 36. The temperature of the water employed within scrubber 34 is desirably as cold as possible, such as a temperature less than 40° C., e.g., a temperature in the range 5–15° C., so as to condense or "knock-out" as much as possible the phosphorus contained in the gas supplied to scrubber 34.

Phosphorus scrubber 34 is positioned and supported within scrubber tank 38, the open, bottom end of the scrubber 34 being in communication with a body of water 39 therein. The body of water 39 within scrubber tank 38 covers any phosphorus values condensed or "knocked-out" within scrubber 34. These phosphorus values are withdrawn from time to time from scrubber tank 38 by means not shown.

There issues from the lower portion of scrubber 34 via line 40 a gaseous stream now substantially free of phosphorus or having a substantially insignificant amount of gaseous phosphorus therein, such as an amount of phosphorus ($P_4$) in the range 0.05–0.15 mm. Hg.

Referring now to FIGS. 6 and 7 of the drawings which illustrate a cooling-condensing apparatus particularly applicable for use with liquid phosphorus as a cooling-condensing medium for the condensation of gaseous phosphorus from a gaseous stream containing the same, the apparatus shown therein comprises a cylindrical, vertically-extending shell made up of three sections, an upper cylindrical section 60, an intermediate cylindrical section 61, a bottom cylindrical section 62. Upper cylindrical section 60 is provided with a flanged opening 64 at the top thereof and four semi-conical recesses 65 disposed 90° apart around the upper periphery of section 60, each of said recesses being provided with a spray head 66 adapted to yield a liquid phosphorus spray defining a solid 30° angle.

Positioned between the bottom of upper section 60 and the top of intermediate section 61 as well as between the bottom of intermediate section 61 and top of section 62 are annular baffles 68 which are provided with a central flanged opening 69 extending therethrough whereby direct communication is provided between sections 62 and 61 and sections 61 and 60. Flanged outlets 70 are provided in the shell wall at the lower end of sections 60 and 61, respectively, the openings thereof being positioned beneath the top 69a of flanged opening 69.

Bottom section 62 is provided with a side opening or outlet 71 and four side brackets or angles 72 suitably fastened or welded to shell 62 for support purposes. An open, cylindrical skirt piece 74 is provided attached to the bottom of section 62 as illustrated.

In the practice of this invention as disclosed with respect to the embodiment illustrated in FIGS. 5–7, emphasis has been placed on effecting direct counter-current contact between a downwardly falling or moving spray of liquid phosphorus and an upwardly moving phosphorus-containing gas stream. The practice of this invention, however, is generally applicable to counter-current and concurrent and mixed countercurrent-concurrent contacting operations involving the use of liquid phosphorus for the condensation of gaseous phosphorus. Further, although the practice of this invention has been described in FIGS. 5–7 in connection with an embodiment employing a two-stage liquid phosphorus contacting operation, any number of contacting operations, one or more than one, may be satisfactorily employed, the contacting operation, particularly the temperatures, being adjusted and controlled in accordance with teachings of this invention to avoid phosphorus fog formation during the condensing operation and to avoid those conditions under which phosphorus fog formation is possible.

The condenser illustrated in FIGS. 6 and 7 is particularly suitable for use as phosphorus condenser 16 illustrated in FIG. 5. Opening 71 of the condenser in condenser section 62 of FIG. 7 is suitable as the inlet in the lower section 16b of condenser 16 of FIG. 5 for the supply of gaseous phosphorus thereinto via conduit 15. Opening 64 of the condenser at the top of condenser section 60 of FIG. 7 is suitable as the outlet in the upper portion of upper section 16d of condenser 16 of FIG. 5 for the recovery of resulting cooled phosphorus-lean gaseous effluent. Lower outlet 70 in the lower portion of condenser section 61 corresponds to the outlet for the recovery and return of liquid phosphorus from the lower portion of section 16c of condenser 16 via conduit 28. Also, outlet 70 provided in the lower portion of upper condenser section 60 corresponds to the outlet for the return and recovery of liquid phosphorus from section 16d of condenser 16 via conduit 26. Spray heads 66 of condenser illustrated in FIG. 7 correspond to spray heads 25 and 22 in condenser section 16d and 16c, respectively, of condenser 16. The flanged openings 69 provided in annular baffles 68 illustrated in FIG. 7 correspond to and are equivalent to the flanged openings provided in annular baffles 16a illustrated in FIG. 5. Further, it is mentioned that the liquid phosphorus sprayed into condenser 16 via spray heads 25 and 22 of FIG. 5 or into the condenser illustrated in FIG. 7 via spray heads 66 is collected by the flanged baffles and only but a very minor portion passes through the openings in the baffles into the next lower section of the condenser.

As will be apparent to those skilled in the art in the light of the accompanying disclosure, many modifications, changes and substitutions are possible in the practice of this invention without departing from the spirit or scope thereof.

I claim:

1. A method of condensing gaseous phosphorus from a gaseous stream containing a minor amount of phosphorus comprising, advancing said gaseous phosphorus along a path through an elongated confined condensing zone which is disposed in connection with a body of aqueous liquid, maintaining a body of molten phosphorus submerged in said body of aqueous liquid, withdrawing molten phosphorus from the body thereof and directing streams of same into said confined condensing zone at successive places along the path for condensation of said gaseous phosphorus into said streams of molten phosphorus, said streams, augmented with the resulting condensed phosphorus, being directed into said body of aqueous liquid for collection in said body of molten phosphorus and withdrawing phosphorus as product from said last mentioned body.

2. In the recovery of phosphorus wherein gaseous phosphorus is condensed from a gaseous stream containing a minor amount of phosphorus by contact with a relatively cool liquid medium and the resulting condensed phosphorus recovered as product, the improvement which comprises employing liquid phosphorus as said relatively cool liquid medium and contacting said gaseous stream in two stages with liquid phosphorus, the liquid phosphorus first to contact said gaseous stream in said first stage being at a temperature $T_1$ and the liquid phosphorus to contact said gaseous stream in said second stage being at a temperature $T_2$, $T_1$ being greater than $T_2$ and $T_2$ being not less than 45° C.

3. A method in accordance with claim 2 wherein $T_1$ is in the range 55–90° C. and wherein $T_2$ is in the range 45–65° C.

4. A method in accordance with claim 2 wherein the temperature differential $T_1-T_2$ is in the range 5–45 degrees centigrade.

5. A method of removing gaseous phosphorus from a gaseous stream containing a minor amount of gaseous phosphorus and a normally gaseous material which comprises contacting said gaseous stream with liquid phosphorus to condense phosphorus from said gaseous stream directly into said liquid phosphorus without condensing said gaseous phosphorus in said stream with the resulting formation of phosphorus fog therein.

6. A process for the manufacture and recovery of phosphorus which comprises chemically reacting a calcium phosphate, silicon dioxide and carbon under conditions to yield a hot gaseous effluent comprising a minor amount of gaseous phosphorus and carbon monoxide together with other materials, contacting said gaseous effluent with a body of relatively cool water to separate at least a portion of said other materials from said effluent, passing the remaining effluent, now having a reduced amount of said other materials, into contact with a stream of relatively cool molten phosphorus to condense gaseous phosphorus from said remaining effluent directly into said molten phosphorus, withdrawing from the aforesaid contacting operation a gaseous stream containing carbon monoxide and having a substantially reduced gaseous phosphorus content and contacting said withdrawn stream with a flow of water to effect recovery of any residual phosphorus values therefrom.

7. A method of recovering phosphorus from a gaseous stream containing gaseous phosphorus and a normally gaseous material which comprises contacting said gaseous stream with molten phosphorus at a temperature sufficient to condense phosphorus from said gaseous stream directly into said molten phosphorus without the formation of a substantial amount of phosphorus fog within said stream, said contacting operation being carried out with said molten phosphorus at a temperature below the dew point of the phosphorus within said gaseous stream.

8. A method of condensing phosphorus from a gaseous stream containing gaseous phosphorus and a normally gaseous material which comprises contacting said gaseous phosphorus-containing stream with relatively cold liquid phosphorus, the relative amounts and temperatures of said gaseous stream and liquid phosphorus being coordinated such that condensation of phosphorus from said gaseous stream occurs substantially only directly into said relatively cold liquid phosphorus without formation of phosphorus fog in said gaseous stream and said gaseous stream during the aforesaid contacting operation is maintained unsaturated with respect to phosphorus.

References Cited in the file of this patent

UNITED STATES PATENTS

| | | |
|---|---|---|
| 1,274,479 | Wenman | Aug. 6, 1918 |
| 1,441,573 | Franchot et al. | Jan. 9, 1923 |
| 2,039,297 | Curtis | May 5, 1936 |
| 2,050,796 | Kerschbaum | Aug. 11, 1936 |
| 2,135,486 | Almond | Nov. 8, 1938 |
| 2,169,261 | Lee | Aug. 15, 1939 |
| 2,785,961 | Carter | Mar. 19, 1957 |
| 2,878,107 | Ruth | Mar. 17, 1959 |

OTHER REFERENCES

Lange's "Handbook of Chemistry," 8th Ed., 1952, pages 56 and 57, Handbook Publishers, Inc., Sandusky, Ohio.